March 5, 1968 N. HUGHES 3,371,869
COMPRESSIBLE FLUID SONIC PRESSURE WAVE ATOMIZING APPARATUS
Original Filed Dec. 23, 1963 5 Sheets-Sheet 1

INVENTOR:
NATHANIEL HUGHES
BY
Curtis, Morris & Safford
ATTORNEYS.

March 5, 1968  N. HUGHES  3,371,869
COMPRESSIBLE FLUID SONIC PRESSURE WAVE ATOMIZING APPARATUS
Original Filed Dec. 23, 1963  5 Sheets-Sheet 2

INVENTOR:
NATHANIEL HUGHES
BY Curtis, Morris & Safford
ATTORNEYS.

INVENTOR:
NATHANIEL HUGHES
BY
Curtis, Morris & Safford
ATTORNEYS.

United States Patent Office 3,371,869
Patented Mar. 5, 1968

3,371,869
COMPRESSIBLE FLUID SONIC PRESSURE WAVE ATOMIZING APPARATUS
Nathaniel Hughes, Bronx, N.Y., assignor to Sonic Development Corporation of America, Yonkers, N.Y.
Original application Dec. 23, 1963, Ser. No. 332,502, now Patent No. 3,240,254, dated Mar. 15, 1966. Divided and this application Oct. 19, 1965, Ser. No. 511,010
3 Claims. (Cl. 239—102)

ABSTRACT OF THE DISCLOSURE

The atomizing apparatus comprises a nozzle having a diverging outlet section for accelerating a compressed gas to supersonic velocities. A cavity resonator member is positioned downstream from the diverging outlet section to amplify the shock waves created by the supersonic gas flow from the nozzle. Liquid to be atomized is injected into the boundary layers of the gas stream flowing in the nozzle so as to form the nozzle walls either with or without the assistance of solid metal. Liquid to be atomized also is injected into the gas stream outside of the nozzle. The liquid is atomized by the sonic pressure waves and other forces. The resulting spray has a high degree of uniformity of droplet particles size. The pertinent portions of the description in this divisional application are those describing FIGURES 6 through 8 and 11.

---

This invention relates to apparatus and methods utilizing expanded and accelerated compressible fluids in generating sonic pressure waves, in atomizing fluent materials, and in burning combustible fluids, and to apparatus and methods for expanding and accelerating compressible fluids utilizable in such sonic apparatus and methods. This is a division of U.S. application Ser. No. 332,502, filed Dec. 23, 1963, now Patent 3,240,254.

An object of the present invention is to provide stable and efficient apparatus and methods for expanding and and accelerating compressible fluids to supersonic speeds wherein the expanding and accelerating apparatus and methods automatically adapt themselves to provide at all times substantially optimum treatment of the compressible fluids despite changing ambient or other process conditions.

Another object of this invention is to provide simple, effective and efficient control means and methods for such apparatus and methods.

A further object of the present invention is to provide compressible fluid-operated sonic pressure wave generating, atomizing, and fuel burning apparatus and methods providing substantially improved performance.

Still another object of this invention is to provide convenient and advantageous methods and apparatus for introducing fluent materials into the sonic energy field of such sonic devices.

Another object of the present invention is to provide sonic atomization and fuel burning apparatus and methods having improved stability.

A still further object of the present invention is to provide apparatus and methods for controlling the pattern of the atomized spray cloud produced by such sonic apparatus.

Another object of the present invention is to provide such apparatus and methods which are simple, economical and inexpensive to practice commercially.

The drawings and descriptions that follow describe the invention and indicate some of the ways in which it can be used. In addition, some of the advantages provided by the invention will be pointed out.

Briefly, the compressible fluid expanding and accelerating method of the present invention comprises passing the compressible fluid (e.g., gas) through a nozzle, and introducing an incompressible fluid (e.g. liquid) into the nozzle in an manner such that the liquid forms barriers which control the expansion and acceleration of the gas. The liquid is injected into the gas flowing in the nozzle so as to form liquid-walled orifices and surfaces adapted to cause the gas to expand, accelerate, and issue from the nozzle in the form of a low pressure stream having supersonic velocity. By directing such a high-speed, low-pressure gas and liquid stream into a pulsator cavity in the manner explained hereinbelow, high-energy sonic pressure waves can be generated and the liquid can be atomized very effectively.

Figure 1:
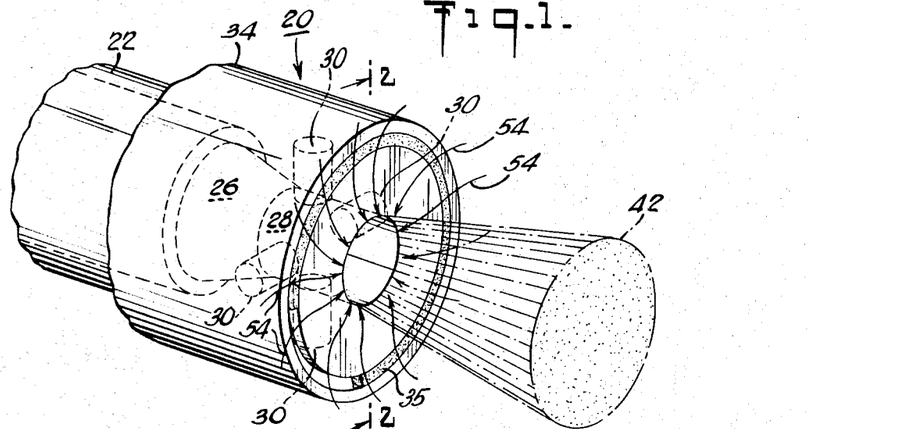
FIGURE 1 is a perspective view of compressible fluid expanding and accelerating apparatus constructed in accordance with the present invention.
Figure 2:
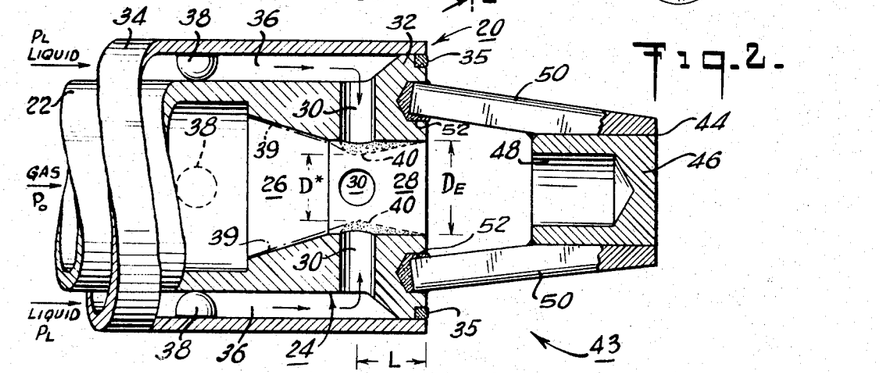
FIGURE 2 is a partially sectional view of a sonic pressure wave generator and atomizer utilizing the apparatus shown in FIGURE 1.

Apparatus for performing the above-described method is shown in FIGURE 1. The nozzle structure indicated generally at 20 in FIGURE 1 also is shown in FIGURE 2 with additional structure for use in generating sonic pressure waves and atomizing liquids. All of the other figures of the drawings also show nozzle structures for performing the above-described method. These structures also are adapted to generated sonic pressure waves, atomize fluids and/or burn combustible fluids.

Referring to FIGURES 1 and 2, the nozzle structure 20 includes a gas supply tube 22 which has a solid-walled nozzle portion, generally indicated at 24, at its exit end. Nozzle 24 has a converging inlet section 26, a cylindrically-shaped exit section 28, and four symmetrically-positioned liquid feed holes 30. The axis of each feed hole 30 is perpendicular to the longitudinal axis of the nozzle 24.

Nozzle 24 has an outwardly-flaring exterior portion 32 at its exit end. A liquid feed tube 34 is fitted concentrically around the gas feed tube 22 and nozzle 24. The forward end of tube 34 is brazed at 35 to the flaring portion 32 of nozzle 24, so as to form a concentric liquid feed passage 36 to supply liquid to holes 30. Four spherical metal spacers 38 are welded to the exterior surface of tube 22. Their outside surfaces are ground down so as to fit into the interior of tube 34. This arrangement provides solid support for tube 34 with respect to tube 22 without appreciably hindering the flow of liquid through passage 36.

The nozzle structure 20 operates as follows: a gas such as air is compressed and supplied to nozzle 24 at a pressure $P_o$ greater than the pressure of the ambient gas surrounding the nozzle structure 20. A liquid is supplied under pressure through passageway 36 and feed holes 30 into exit section 28 of the nozzle. The gas flows through nozzle section 28 swiftly and forms a "boundary layer," indicated by dashed lines 39, along the interior walls of the nozzle. The fast-flowing gas causes the liquid entering through holes 30 to spread around the nozzle and form liquid barriers whose outlines are indicated by dashed lines 40 in FIGURE 2. The gas boundary layer 39 merges with the liquid barriers 40 so that the liquid barriers serves as the new boundary layer for the nozzle.

The liquid barriers 40 constrict the flow of air through section 28. As can be seen in FIGURE 2, their shape is such as to form a "virtual" converging-diverging nozzle. That is, barriers 40 tend to occlude the nozzle at the exits of feed holes 30, and then spread and become thinner at positions progressively further downstream from the feed holes. The liquid is partially atomized by the shear forces between it and the high-speed gas stream. Thus, the new boundary layer for the nozzle is an intimate mixture of gas and liquid particles. The partially atomized liquid and the gas stream emerge from the nozzle structure as indicated at 42 in FIGURE 1. The liquid is believed to be formed into a column having a generally conical shape when it emerges from the nozzle.

It is believed that this liquid-walled nozzle functions in a manner similar to a solid-wall converging-diverging nozzle. That is, barriers 40 accelerate the incoming gas to a speed of Mach 1.0, and then, in the liquid-walled diverging section, further accelerate and expand the flowing gas. Solid-walled converging nozzle section 26 can be used as shown in FIGURE 1 to aid in the initial acceleration of the gas, but such a section is not necessary. The acceleration and expansion provided by barriers 40 is fully effective. Applicant has found that nozzles constructed with only a straight section 28 operate in a highly satisfactory manner.

When the liquid reaches the exit opening of nozzle section 28, the layer it forms is very thin. Therefore, the effective exit opening diameter for the virtual nozzle is the diameter $D_E$ of cylindrical section 28. The effective "choked orifice" or "neck" diameter $D^*$ of the liquid-walled nozzle is located approximately in the plane formed by the longitudinal axes of feed holes 30.

The pressure $P_E$ and Mach number $M_E$ at the exit of the nozzle can be computed by use of the following equations which are taken from "The Thermodynamics of Compressible Fluid Flow," Shapiro, volume 1, Chapter 4; Ronald Press, New York, 1953.

(1) $$\frac{A}{A^*} = \frac{1}{M}\left[\left(\frac{2}{k+1}\right)\left(1+\frac{k-1}{2}M^2\right)\right]^{\frac{k+1}{2(k-1)}}$$

(2) $$\frac{P_o}{P} = \left[1+\frac{k-1}{2}M^2\right]^{\frac{k}{k-1}}$$

Where:

$A$ = the cross sectional area of the nozzle's conduit at any point along its longitudinal axis.
$A^* = \pi(D^*)^2/4$, the approximate cross sectional area, in square inches, of the liquid-walled nozzle conduit at the point where the Mach number of the gas in the nozzle = 1.0.
$M$ = the Mach number of the flowing gas at any point along the nozzle's longitudinal axis at which the nozzle's cross sectional area is A and the pressure of the gas flowing is P.
$K$ = the ratio of specific heats of the gas flowing through the nozzle.
$P_o$ = the pressure, in pounds per square inch absolute, of the gas at the nozzle inlet (stagnation pressure).
$P$ = the pressure, in pounds per square inch absolute, of the gas in the nozzle at any point along its longitudinal axis.

It is believed that both the minimum pressure and the maximum Mach number in the gas stream occur approximately at the exit opening of the nozzle. After the gas stream leaves the nozzle, its pressure rises and its Mach number falls.

The feed holes 30 are located such that the length L of the liquid-walled diverging nozzel section is optimum for the range of operation desired. For example, the length L can be optimized for use in a sonic pressure wave generator by considering the distance L as the length of a solid-walled diverging nozzle section and utilizing the principles set forth in my copending U.S. Patent Application Ser. No. 239,236, filed Nov. 21, now Patent 3,230,923, to determine the optimum value for L.

It has been found that the diameter $D^*$ of the throat of the liquid-walled nozzle depends upon the gas flow rate $Q_A$ through the nozzle and the rate $Q_L$ at which the liquid is supplied through the feed holes 30. The relationship of these quantities to one another is given by the following equation:

(3) $$D^* = C\frac{P_o Q_A}{Q_L}$$

Where:

$D^*$ and $P_o$ are defined above, with $D^*$ being given in inches;
$Q_A$ = the quantity of gas flowing through the nozzle, in standard cubic feet per minute;
$Q_L$ = the quantity of liquid flowing through the feed holes 30, in pounds per hour; and
$C$ = a constant whose value is a function of the fixed diameter $D_E$ of each nozzle and the type of liquid supplied and other conversion factors.

It is preferred that the gas be supplied at a relatively constant flow rate. Under such circumstances, $P_o$ is a function of $D^*$ and $Q_A$, and $D^*$ is a function of $Q_A$ and $Q_L$.

Thus, the liquid-walled nozzle is one in which the operational characteristics such as exit Mach number $M_E$ and pressure $P_E$ can be controlled by deliberately varying the gas flow rate $Q_A$ and/or the liquid supply rate $Q_L$. This method of control is extremely simple and provides variability not previously available.

It has been found, unexpectedly, that this liquid-walled nozzle is self-adjusting. For example, if the inlet pressure $P_o$ drops suddenly (with the gas being supplied at a constant rate), the diameter $D^*$ decreases automatically. The nozzle react to this change automatically to return $D^*$ and the pressure $P_o$ to their initial values, thus maintaining constant the Mach number and pressure of the gas stream produced by the nozzle. An advantageous result of this is that the power input, which is the product of inlet gas pressure and air flow rate $P_o \times Q_A$, is substantially constant throughout a wide range of variation of liquid viscosity.

The flow through this liquid-walled nozzle also is unexpectedly stable; that is, there is, practically speaking, no "separation" of the gas from the liquid or solid walls of the nozzle, and no turbulence in the gas boundary layer. One reason for this stability, it is believed, is that the liquid is introduced into the boundary region of the nozzle and blends with the gas boundary layer 39. It is believed that the high speed gas forces the liquid toward the walls of the nozzle and, as explained above, breaks it up into globules which become intimately dispersed in the gas boundary layer. This increases the mass and, therefore, the fluid momentum in the gas boundary layer, thus reducing the likelihood that the boundary layer will become turbulent or separate. Furthermore, it is believed that the liquid cools the boundary layer gas and increases its density, thus further reducing the tendency toward turbulence or separation and further improving the stability of the nozzle.

Another advantage of this expanding and accelerating method and apparatus is that the liquid wall of the nozzle provides excellent insulation against heat transfer between the flowing gas and the solid nozzle walls. Thus, if the flowing gas is very hot the solid nozzle walls are protected by the liquid wall and are not likely to become overheated.

Although four liquid feed holes are shown in FIGURE 1, the number used may be varied as desired. It is preferred to use then in pairs, with the pairs being spaced symmetrically around the nozzle 24, and the holes of each pair being positioned opposite one another.

FIGURE 2 illustrates sonic pressure wave generating and atomizing apparatus and methods in accordance with the present invention. The generating and atomizing apparatus, indicated generally at 43, includes the nozzle structure 20 and a pulsator unit 44.

The apparatus and methods illustrated in FIGURE 2, as well as in the other figures of the drawings, represent improvements over those disclosed in my co-pending applications for U.S. Letters Patent Ser. No. 260,738 filed Feb. 25, 1963, now Patent 3,240,253; No. 247,221 filed Dec. 26, 1962, now Patent 3,230,924; and No. 239,236 filed Nov. 21, 1912, now Patent 3,230,923. The disclosures of those patent applications hereby are incorporated into this application. Those patent applications describe sonic pressure wave generation and atomization apparatus and methods utilizing means such as a pressurized-gas-supplied nozzle having a diverging exit section for creating a high-speed, low-pressure, gas jet which is directed into a cavity pulsator to create a sonic pressure wave output. The sonic generators of Patent 3,230,924 and 3,230,923 produce very high intensity sonic energy with great efficiency. In the atomizers of Patent 3,240,253, fluent materials to be atomized are introduced into the sonic pressure wave energy field at a position outside the exit opening of the nozzle. Such apparatus and methods provide highly advantageous atomization of fluent materials and project them outwardly in the form of a cloud of microscopic droplets. Additional features of the invention disclosed in that patent application make its use in fuel burners highly advantageous.

The pulsator unit shown in FIGURE 2 includes a member 46 with a pulsator cavity 48 in it. Member 46 is secured to nozzle structure 20 by means of a pair of legs 50 with rounded outer edges. Legs 50 are brazed to member 46 and are brazed into holes 52 in the forward end of nozzle member 24. The cavity 48 is positioned and has dimensions determined in the manner disclosed in my above-identified Patent 3,230,923. Other details of the pulsator structure are described more fully in that application and my other co-pending patent applications identified above.

In accordance with the present invention, nozzle structure 20 is operated so that the exit pressure $P_E$ of the gas emerging from the section 28 is lower than the pressure of the ambient gas, and preferably is below one or two pounds per square inch absolute. The ratio $A_E/A^*$ of the exit opening area to the "choked orifice" area is greater than 1.0 and preferably is greater than 1.5. Also, the Mach number $M_E$ of the gas emerging from the nozzle is greater than 1.0 and preferably greater than 1.6.

With this arrangement, ambient gas will be drawn in or "imploded" into the emerging high-speed gas steam as indicated by arrows 54 in FIGURE 1. This inward flow or "implosion" of ambient gas into the emerging gas stream 42 increases the mass and pressure and, therefore, the momentum of the stream 42 and greatly increases the sonic power output and efficiency of the unit. It is believed that this unit develops a highly concentrated "core" of sonic pressure wave energy in the region between the exit of nozzle and pulsator cavity 48. Powerful sonic pressure waves then spread outwardly from this intense core of energy. The liquid is intimately subjected to energy in this "core" and is thereby broken up into minute particles.

Figures 4, 5:
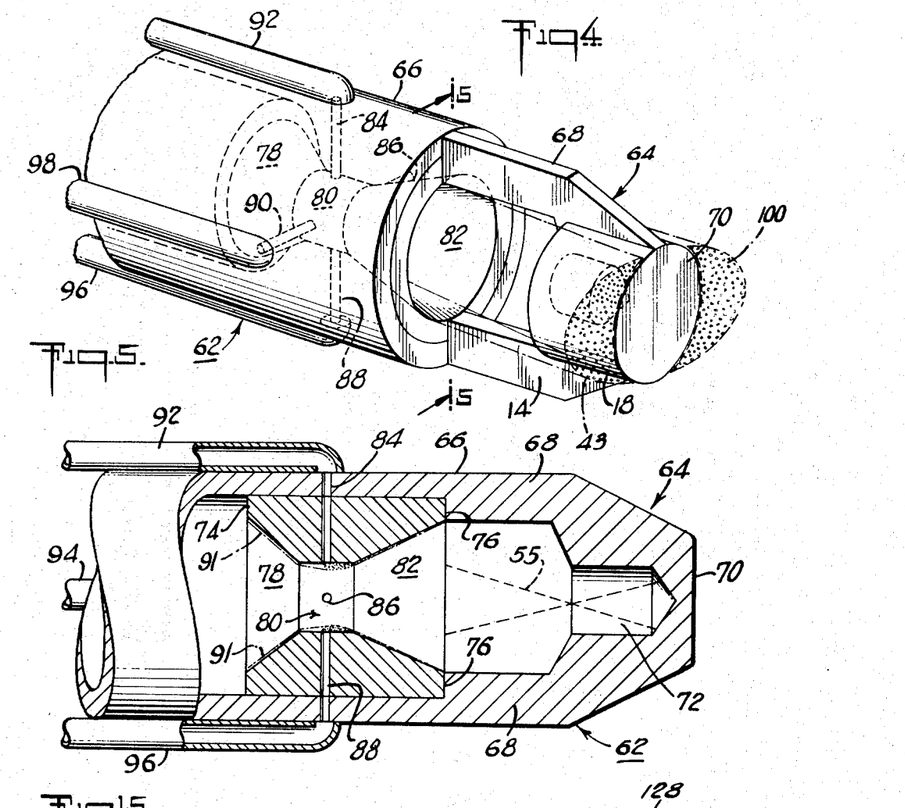
FIGURE 4 is a perspective view of another sonic pressure wave generating and atomizing unit embodying the present invention.
FIGURE 5 is a sectional view taken along line 5—5 of FIGURE 4, in the direction of the arrows.

As is described in greater detail in my above-identified co-pending patent applications, it is believed that a train of oblique shock waves is set up in the jet in the process of deceleration of the jet gas and its return to a state of equilibruim with the ambient gas. The probable outline of said waves is indicated at 55 in FIGURE 5. Since the pressure in the jet at the nozzle exit is sub-ambient, the first wave downstream from the nozzle exit is a compressional shock wave which tends to compress the jet gas and return it to ambient pressure. The entrance to cavity 72 is located approximately at the first intersection point of the shock wave outline, and the reflecting rear wall of the cavity is located in the last half of the first shock wave. That is, the reflecting rear wall is located between $\lambda$ and $3/2\lambda$ downstream from the plane of location of the diameter $D_A$, the diameter of the gas passageway of the nozzle at the position where the pressure of the gas in the passageway equals ambient pressure, where $\lambda$ is given approximately by the following equation:

$$\lambda = 1.307 D_A \sqrt{M_E^2 - 1}$$

Among the many advantages of the sonic generating and atomizing unit 43 is its stability. As mentioned above, the liquid-walled nozzle structure 20 is self-adjusting. Thus, the flow characteristics of the gas stream emerging from the nozzle remain relatively constant despite fluctuations in operating conditions. This stability means that the pulsator cavity 48 will be at an approximately optimum location at all times, and the other dimensions of the unit 43 will be similarly optimum.

Further, unit 43 is capable of producing a very high power sonic output, e.g., well over 5,000 acoustic watts. Also, it can atomize viscous liquids at a high rate, e.g., well over 500 gallons per hour, and produces droplets of substantially uniform size. It can atomize viscous and non-viscous liquids equally well. Furthermore, the "cone angle" of the conically-shaped pattern of the spray emerging from the atomizer is relatively narrow and the spray is thrown forward with considerable force. In addition, its sonic output can be varied easily by changing the gas flow rate $Q_A$ and/or the liquid supply rate $Q_L$.

Still further, it is believed that use of the method and apparatus described above increases the efficiency of the atomizer and that the volume of pressurized gas required to atomize a given amount of material is less than in previous atomizers of this type.

Figure 3:
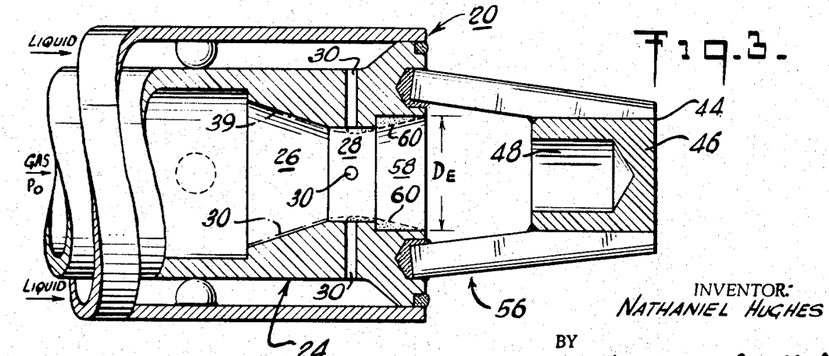
FIGURE 3 is a view, similar to that of FIGURE 2, of another sonic pressure wave generator and atomizer in accordance with the present invention.

Referring now to FIGURE 3, the sonic generator and atomizer unit 56 shown is the same as unit 43 shown in FIGURE 2 except that liquid feed holes 30 are smaller (optionally) and a cylindrical recess or "step" section 58 is formed in section 28.

Step section 58 is provided to give the nozzle a larger exit diameter $D_E$, to provide liquid storage space in the nozzle conduit, and to provide a "flexible" liquid wall in the diverging nozzle section. Equations 1 through 3 above are applicable to compute flow conditions through the nozzle of unit 56, as in nozzle unit 20 of FIGURES 1 and 2.

The larger exit diameter $D_E$ provides means for producing lower exit pressures and higher speeds in the gas stream emerging from the nozzle. It is believed that the "flexible" liquid wall is formed when the liquid emerges from holes 30 and forms a liquid boundary indicated by dashed lines 60. Since the "step" section 58 is abruptly offset from section 28, the main flow of liquid and gas leaves the solid walls of the nozzle. It is believed that a low-speed gas-liquid mixture is stored in the offset section between boundary 60 and the solid walls of the nozzle. This produces increased atomizing efficiency. The liquid wall 60 is termed a "flexible" wall because it is believed to move inwardly and outwardly to change the rate of acceleration and expansion of the gas in response to changes in ambient pressure inlet pressure fluctuations, etc. Thus, the flexible wall 60 improves the stability and performance of the device because, it is believed, the flexible wall automatically compensates for changing conditions in much the same manner as do the liquid walls in the unit shown in FIGURE 2.

The generating and atomizing devices shown in the remaining figures of the drawings are like those shown in FIGURES 2 and 3 in that the fluid to be atomized is introduced into the gas stream while the stream is still contained within the solid-walled nozzle. The liquid forms new boundary layers in the solid-walled nozzle, and the gas flow through the nozzle is modified as described with respect to FIGURES 1, 2 and 3, and as described by Equations 1 through 3. The fluid is introduced into the nozzle in various arrangements which provide advantageous liquid walls for the nozzle. These arrangements also provide means for controlling the shape of the spray and allow the fluid to be introduced into the unit in a simple and highly efficient manner.

Referring to FIGURES 4 and 5 of the drawings, the sonic atomizer unit 62 includes a nozzle housing, indicated generally at 64, which comprises a tubular-shaped section 66 connected to a pair of leg-like members 68 terminating in an end portion 70 containing a pulsator cavity 72 with its open end facing towards tubular section 12.

A cylindrical nozzle member, generally indicated at 74, is mounted inside nozzle housing member 64 with its forward end abutting under-cut portions 76 of the rear ends of legs 68 (see FIGURE 5). Nozzle member 74 has a converging inlet section 78 a cylindrical middle or "stabilizing" section 80, and a diverging outlet section 82. A source of pressurized gas (not shown) is connected to tubular portion 66 of nozzle housing 64. Pressurized gas flows from the supply through nozzle 74 and emerges in the form of a gas jet which is intercepted by pulsator cavity 72.

When constructed and operated in accordance with the above-mentioned patent applications, the nozzle 74, like the nozzle structure 20 described above, produces a gas jet having a Mach number substantially greater than 1.0, and preferably greater than 1.6, at the exit of the nozzle. The Mach number of the stream in the stabilizing section is approximately 1.0. The nozzle also produces at its exit a pressure appreciably less than the pressure of the ambient gas surrounding the nozzle and preferably less than 1 or 2 pounds per square inch absolute (p.s.i.a.). In order to attain these flow characteristics, the ratio of the cross-sectional area of the nozzle exit opening to the cross-sectional area of the stabilizing section 80 is made greater than 1 to 1 and preferably 1.5 to 1 or greater.

As in the nozzle 20 described above, the substantial difference between the presure at the exit of the nozzle and the ambient gas causes the ambient gas to be drawn in or "imploded" into the intense sonic energy "core" produced in the region between the exit of nozzle 74 and the entrance of pulsator cavity 72. This implosion greatly enhances the power output and efficiency of the sonic generator.

In accordance with the present invention, four symmetrically-positioned fluid delivery holes 84, 86, 88 and 90 are formed through tubular section 66 and nozzle member 74 into the stabilizing section 80 of the nozzle. Four tubes 92, 94, 96 and 98 are secured to tubular housing 66 so as to communicate, respectively, with holes 84, 86, 88 and 90.

In accordance with one embodiment of the method of the present invention, the fluid (e.g., liquid) to be atomized is supplied through tubes 84, 86, 88 and 90 and holes 92, 94, 96 and 98 into the gas stream flowing through the nozzle in the stabilizing section 80.

As described above in conjunction with the FIGURES 1, 2 and 3 embodiments, it is believed that the high-speed gas stream flowing through the nozzle forces the liquid toward the solid walls of the nozzle and breaks it up into globules which become intimately dispersed in the gas boundary layer 91. The fluid then flows through the nozzle in the boundary regions and, if the rate of flow through each fluid feed hole is substantially the same, the fluid is emitted from the nozzle in the form of an evenly-distributed, cylindrically-shaped sheet. This sheet of fluid globules then is violently agitated and further broken-up into microscopic particles by the intense sonic energy developed in and emitted from pulsator cavity 72. The resulting spray formed is made up of microscopic fluid droplets of substantially uniform size.

This arrangement has many advantages, including the advantages of the FIGURES 1 through 3 embodiments. It has improved stability and, as in the FIGURES 2 and 3 arrangements, its operational characteristics are easily controlled by varying the rates of fluid input to the device in accordance with Equations 1 through 3 above.

Another advantage is that the fluid is emitted from the nozzle in an evenly-distributed pattern at substantially all rates of fluid input to the unit. As a result, despite wide variations in fluid input rates, the atomizer produces a fine, even spray that is substantially free from large drops or globules of unatomized fluid. This is an improvement over some previous atomizers in which relatively large globules of unatomized fluid dropped or "drooled" from the nozzle occasionally, especially when the fluid input rate was very high or very low. Also, the spray cone angle is relatively small and the spray is projected forward with considerable force.

A further advantage of this arrangement is that multiple inlet tubes are provided for mixing different fluids with one another. By injecting the fluids into the gas stream in the nozzle, more time is provided for them to become mixed before being atomized by the sonic presure waves. Thus, the device produces a more thorough mixing of such fluids.

Further in accordance with the method of the present invention, the fluids supplied through the feed tubes 92, 94, 96 and 98 may be supplied at various different flow rates so as to provide a means for controlling the pattern of the spray produced by the atomizer. For example, fluids can be supplied to opposing holes 84 and 88 at one flow rate and to opposing holes 86 and 90 at a different rate. The shape of the spray produced bulges outwardly from the longitudinal axis of the unit in the plane of the holes through which the greater quantity of fluid flows, and dips inwardly in the plane of the holes through which less fluid flows. For example, the generally oval-shaped spray pattern 100 (shown in section in FIGURE 4) is produced when the fluid flow rate through holes 84 and 88 is greater than that through holes 86 and 90. The pattern bulges outwardly in the longitudinal plane coincident with holes 84 and 88 and dips inwardly in the plane of holes 86 and 90. Thus, by controlling the input fluid flow rates through various sets of opposing hole pairs, the spray pattern developed by the atomizer can be given an oval, flat, or some other shape desirable for use in a given application.

Also, in accordance with the method of the present invention, a gas may be supplied to one pair of opposing tubes such as tubes 92 and 96 while a liquid is supplied to the other set of opposing tubes 94 and 98. The gas supply may, if desired, be the same as that used to supply gas to the nozzle 74. This arrangement provides for easy and effective control of the spray pattern of the atomizer.

Figure 6:
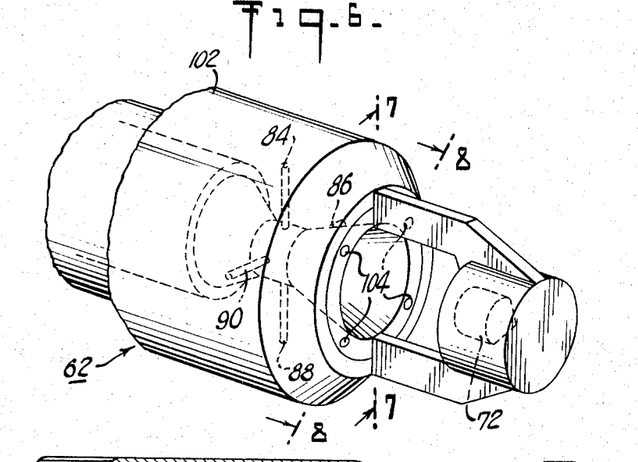
FIGURE 6 is a perspective view of still another sonic pressure wave generating and atomizing unit embodying the present invention.
Figure 7:
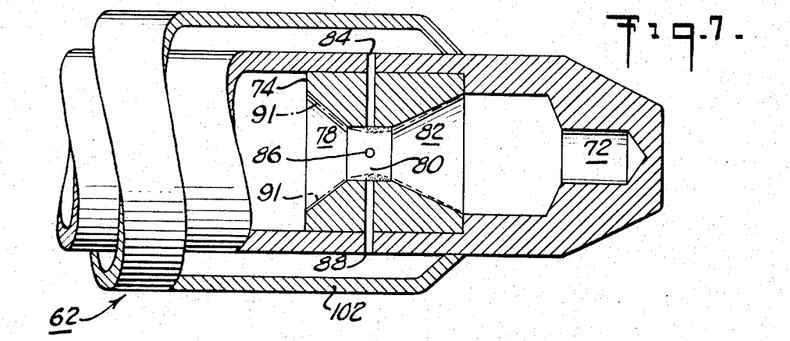
FIGURE 7 is a sectional view taken along line 7—7 of FIGURE 6.
Figure 8:
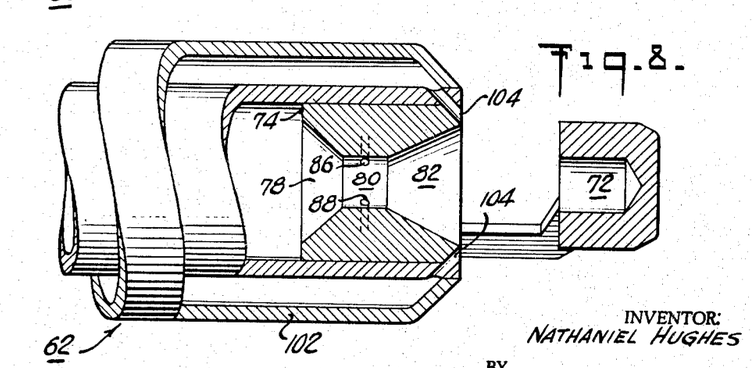
FIGURE 8 is a sectional view taken along line 8—8 of FIGURE 6.
Figure 9:
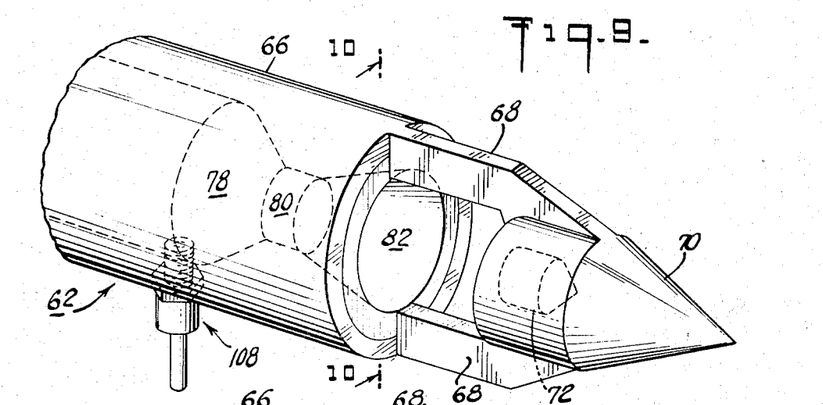
FIGURE 9 is a perspective view of yet another sonic pressure-wave generating and atomizing unit embodying the present invention.
Figure 10:
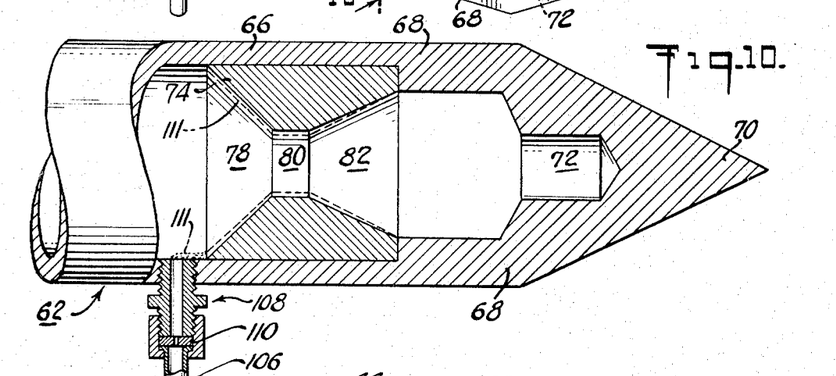
FIGURE 10 is a sectional view taken along the line 10—10 of FIGURE 9.
Figure 11:
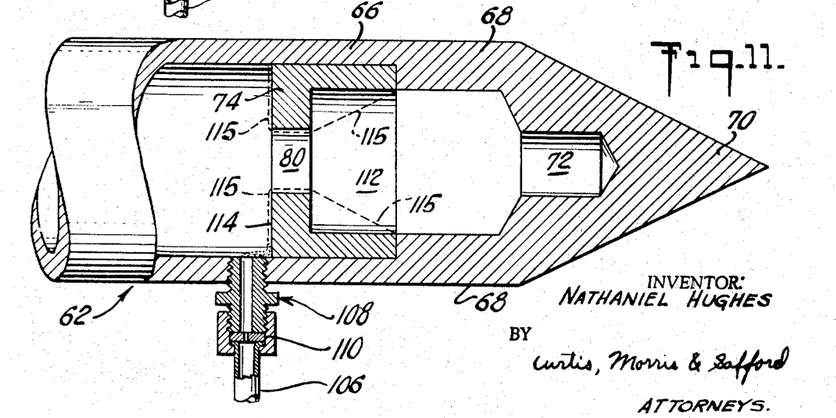
FIGURE 11 is a sectional view like that of FIGURE 10, of another sonic pressure-wave generating and atomizing unit of the present invention.
Figure 12:
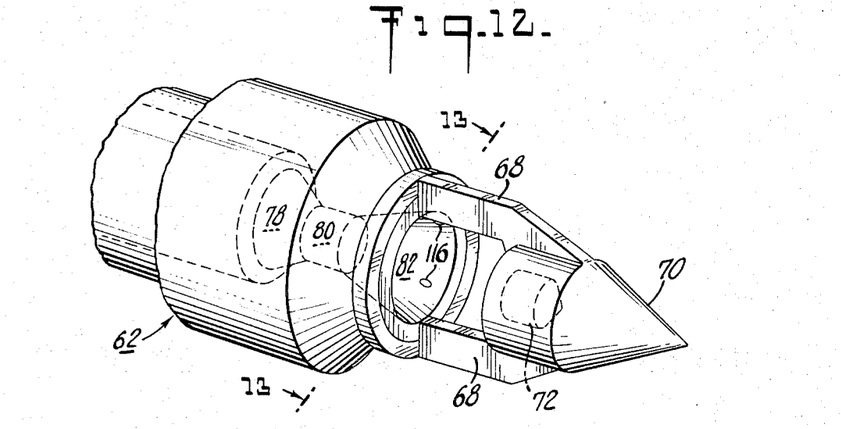
FIGURE 12 is a perspective view of another sonic pressure wave generating and atomizing unit embodying the present invention.
Figure 13:
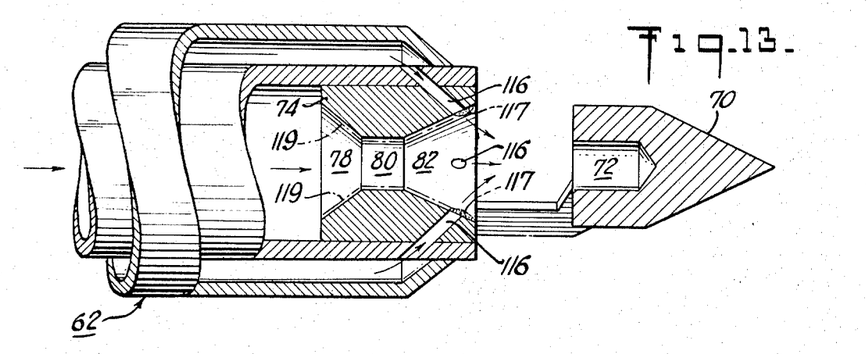
FIGURE 13 is a sectional view taken along line 13—13 of FIGURE 12.
Figure 14:
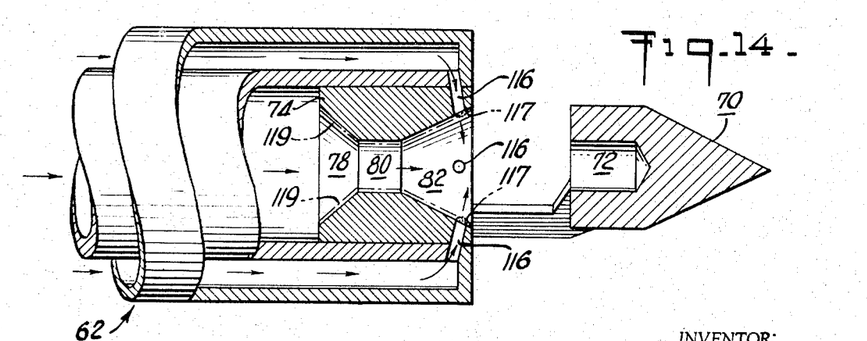
FIGURE 14 is a sectional view, like that of FIGURE 13, of another sonic pressure-wave generating and atomizing unit of the present invention.

The atomized unit 62 shown in FIGURES 6, 7 and 8 has the same construction as the unit shown in FIGURES 1 and 2 except that the four fluid supply tubes 84, 86, 88 and 90 are replaced by a single tube 102, and four additional fluid supply holes 104 exiting outside of nozzle structure 74 are provided.

In this arrangement, a portion of the fluid to be atomized is supplied through tube 102 to all four of the stabilizer section holes 84, 86, 88 and 90 at substantially the same pressure. This fluid flows into nozzle section 80, forms a liquid-walled nozzle in solid-walled nozzle 74 and is atomized in the manner described above with respect to FIGURES 1 through 5. The remainder of the fluid flows into the sonic field through holes 104 which exit outside the nozzle 74. Outside nozzle 74 all of the fluid is atomized by the high-energy sonic pressure waves emanating from pulsator cavity 72.

An advantage of this arrangement is that its spray has an increased forward "throw" and a narrow cone angle. By adjusting the rate of flow through holes 84, 86, 88 and 90 relative to the rate of flow through holes 104, the spray can be made to "billow" forward with a low velocity or rush forward at a relatively high velocity, as desired.

The spray shape can be changed from circular to some other shape desired by making the diameter of each of one pair of opposing holes 84 and 88 different from that of the others 86 and 90. The flow rate through the pairs of holes then will be different and the spray shape will be altered in the manner described above with respect to FIGURES 4 and 5.

The atomizer 62 shown in FIGURES 9 and 10 is similar to the atomizer shown in FIGURES 4 and 5 except that the fluid to be atomized is supplied into nozzle 74 at a position up-stream from converging section 78 instead of being fed into stabilizing section 80. Converging section 78 is shaped so that the edge of its inlet opening lies flush against the inside wall of housing 66, thereby providing a smooth inclined surface for guiding fluid into the nozzle. Also, the front end of pulsator unit 70 is given a pointed shape in accordance with the principles disclosed in my above-mentioned Patent 3,240,253.

In this arrangement the fluid supply structure is uncomplicated and inexpensive. Fluid to be atomized is supplied through a tube 106 and into the atomizing unit by means of a standard screw fitting 108 which is mounted in a threaded hole in housing 66. As is shown in FIGURE 10, a small orifice plate 110 blocks the exit opening of tube 106. Orifice plate 110 has a small hole in its center which serves to meter the fluid flow into the atomizer unit. The fluid flow rate can be changed easily and inexpensively merely by exchanging the orifice plate 110 for another having a different size orifice.

The fluid flows through tube 106 and fitting 108 into housing 66 where it is spread evenly around the inside circumference of the converging nozzle section 22 by the high-speed stream. It forms a boundary layer 111 and creates a liquid-walled nozzle in solid-walled nozzle 74 and functions in the manner described above and in accordance with Equations 1 through 3 to control the gas flow through the nozzle. The fluid then is atomized in the manner described above.

As explained above, the fluid feed apparatus for this arrangement is extremely simple in construction, and its use prevents cluttering the forward portions of the atomizer unit with equipment. This is especially advantageous in situations where a minimum amount of space is available in which to house or mount the forward part of the atomizer unit.

The generating and atomizing unit 62 shown in FIGURE 11 is the same as that shown in FIGURES 9 and 10 except that the unit has been modified to form a "flexible" liquid-walled nozzle similar to that shown in FIGURE 3. A cylindrically-shaped exit section 112 is provided. Section 112 is like section 58 of the FIGURE 3 embodiment; it is "stepped" or offset from stabilizing section 80. In addition, no solid-walled converging nozzle section is provided. Instead, an abrupt inlet surface 114 is provided for the nozzle 74, and the fluid inlet fitting 108 is positioned close to surface 114. The fast-moving gas stream draws the liquid entering from fitting 108 into stabilizing section 80 where it is spread around in the nozzle and forms a boundary layer 115, thus forming a liquid-walled nozzle as in the embodiments described previously. The liquid then forms a flexible diverging liquid wall which expands and accelerates the gas in the stream in the manner described above in connection with the FIGURE 3 embodiment.

This arrangement has the advantage of even greater simplicity of construction. Also, the unit has automatic self-adjustment to compensate for operational fluctuations, liquid-storage in the stepped section 112, and the other advantages of the FIGURE 3 embodiment.

The atomizer 62 shown in FIGURES 12 and 13 is similar to that shown in FIGURES 6, 7 and 8 except that stabilizer section feed holes 84, 88 and 90 and external feed holes 104 are not provided. Instead, there are provided four fluid feed holes 116 which exit into the diverging section 82 of the nozzle, thus guiding the fluid into the interior of the nozzle as in the previously-described embodiments of the present invention. Also, the end of pulsator unit 70 is given a pointed shape as in the FIGURES 9 and 10 embodiment.

This arrangement has the advantage of being uncomplicated while still having many of the advantages obtained in the previously-described methods and apparatus. The fluid supplied through holes 116 spreads into an even, symmetrical boundary layer sheet 117 before emerging from the nozzle and being atomized. The flow of fluid in the gas boundary layers 119 improves the stability of operation of the atomizer, it is believed, in the manner described above. That is, the injection of liquid into the diverging solid-walled section forms a liquid-walled diverging nozzle section. In addition, this mode of injection seems to cause a build-up and thickening of the gas boundary layer 119 upstream from the point of liquid injection so that the stabilizing section is occluded so as to regulate the gas flow through the nozzle in the same manner as in the other embodiments described previously. The forward "throw" of the spray is increased and the spray cone angle is decreased in this device.

The generating and atomizing unit 62 shown in FIGURE 14 is the same as that shown in FIGURES 12 and 13 except that the structure has been modified to align the axes of fluid feed holes 116 to be approximately perpendicular to the longitudinal axis of the nozzle 74. Thus, holes 116 direct the fluid to the atomized into the gas stream at an angle approaching 90° to the nozzle axis. This arrangement provides further improved atomization, forward spray throw, and cone-angle definition.

The atomizers and generators constructed and operated in accordance with this invention provide special advantages when used in fluid fuel burners for furnaces and the like. FIGURE 15 shows a fuel burner using a sonic atomizer 43 of the type shown in FIGURE 2 mounted in a fluid feed unit indicated generally at 118. This fuel atomizer projects through a hole 120 in a wall 122 of a furnace which may be used to heat boiler tubes 124 or the like.

Atomizer unit 43 is fitted into a coupling device 126 which permits its easy insertion and removal, thus providing easy interchangability of atomizing units in the furnace. Liquid fuel, such as furnace oil, is provided from a supply 128 and is fed into fluid feed unit 118 through a pipe 130.

Similarly, pressurized air to operate atomizing unit 62 is fed from a supply 132 through a pipe 134 to feed unit 113. The atomized cloud of fuel emitted from atomizing unit 62 may be ignited initially by a gas flame 136, a spark or other suitable igniting device, and thereafter it immediately bursts into a flame 138 and continues to burn without the need for further ignition.

The flame produced by this fuel burner is a "brilliant" flame; that is, a flame in which combustion is essentially complete and is substantially uniform throughout. Further aspects of the quality of this flame are described more fully in my above-mentioned Patent 3,240,253.

Figure 15:
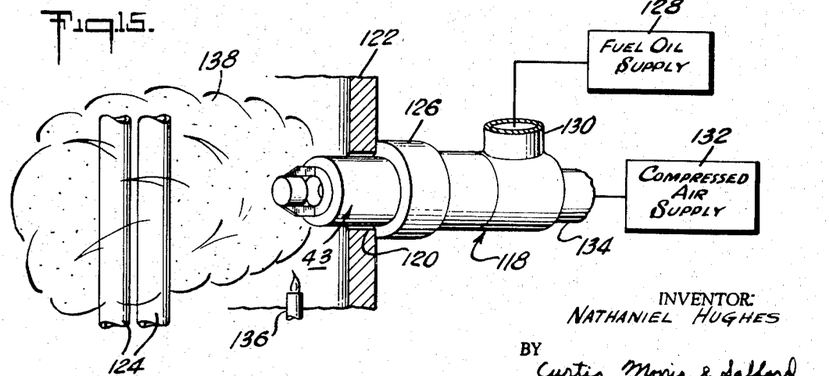
FIGURE 15 (which is located on the same sheet as FIGURES 4 and 5) is a perspective, partly sectional view of a fuel burning unit constructed in accordance with the present invention.

The improved fuel burning apparatus and method provided by the present invention produces a flame which has a greater forward velocity than in previous fuel burners of this type. Although it is advantageous to provide a flame which is very "soft," i.e., one that "billows" with a low forward velocity, in some furnaces in which the furnace gases flow rapidly and in gusts, it is desirable to give the flame a greater forward velocity so that it will not easily be deflected by such gusts. The fuel burning unit shown in FIGURE 15 provides a flame having a forward velocity great enough to resist significant deflection by furnace gusts. It is believed that this increased forward velocity is a result of feeding fuel into the gas stream before the stream leaves the nozzle. This fuel is accelerated to relatively high velocities, thus giving the resulting spray and flame a higher forward velocity and momentum.

It should be understood that the atomizers shown in FIGURES 3 through 14 all can be used advantageously in the fuel burner of FIGURE 15.

The above description of the invention is intended to be illustrative and not limiting. Various changes or modifications in the embodiments described may occur to those skilled in the art and these can be made without departing from the spirit or scope of the invention as set forth in the claims.

I claim:

1. Apparatus for atomizing liquids, said apparatus comprising, in combination, a gas-operated pressure wave generator including a gas-expanding and accelerating nozzle comprising a body member forming a gas flow passageway having an exit opening for issuing a high-speed gas stream, means in said body member for constricting said gas flow passageway upstream from said exit opening, means in said body member downstream from said constricting means and adjacent said exit opening of said gas flow passageway for giving said passageway a cross-sectional area increasing in the direction of flow of gas through said nozzle, said passageway including at least two sections, the walls of said sections being essentially straight in the direction of gas flow therethrough, said passageway having a cross-sectional area in the upstream one of said sections which is larger than the cross-sectional area in the other of said sections located downstream from said first section, the walls of said passageway in said first section being abruptly offset from those in said other section, resonator means positioned downstream from said exit opening of said nozzle and intercepting the high-speed gas stream issuing from said exit opening, and means for injecting said liquids into a boundary layer of gas between a wall of said passageway and a gas stream flowing in said passageway at a position upstream from said other section of said passageway, thereby effecting the atomization of said liquids.

2. Apparatus as in claim 1 including a third section for said passageway, said third section having a cross-sectional area greater than that of said other section and being located downstream from said other section.

3. Apparatus for atomizing fluent materials, said apparatus comprising, in combination, a gas-operated pressure wave generator including a gas-accelerating and stream-forming nozzle comprising a body member forming a gas flow passageway, first, second and third longitudinal positions in said body member, said second position being spaced from said first position in the direction of flow of gas through said nozzle and said third position being spaced from said second position in the direction of flow of gas through said nozzle, restrictor means reducing the cross-sectional area of said gas flow passageway and forming a reduced orifice at said first longitudinal position, stabilizing means in said gas flow passageway between said reduced orifice and said second longitudinal position, said stabilizing means providing a substantially constant cross-sectional area for said passageway between said reduced orifice and said second longitudinal position, said stabilizing means also providing another orifice at said second longitudinal position, said other orifice having a cross-sectional area substantially equal to that of said reduced orifice, expansion means in said gas flow passageway between said other orifice and said third longitudinal position, said expansion means providing an increasing cross-sectional area for said passageway between said other orifice and said third longitudinal position in the direction of flow of gas through said nozzle, resonator means, means for positioning said resonator means adjacent the exit opening of said gas flow passageway, means for feeding said fluent materials into the gas forming said stream within said nozzle at a position within said stabilizing means, and for subjecting said fluent materials to pressure waves developed by said generator and effecting the atomization of said fluent materials, and separate means for injecting said fluent materials into said high-speed gas stream at a position downstream from the exit of said nozzle.

References Cited

UNITED STATES PATENTS

| 1,339,709 | 5/1920 | Mohn | 158—74 |
| 1,563,123 | 11/1925 | Wade | 239—434.5 |
| 2,532,554 | 12/1950 | Joeck. | |

JAMES W. WESTHAVER, *Primary Examiner.*